Oct. 18, 1960 A. KRYNYTZKY 2,956,666
LENGTH GAGE FOR STRUCTURAL STEEL BEAMS AND THE LIKE
Filed March 15, 1957 4 Sheets-Sheet 1
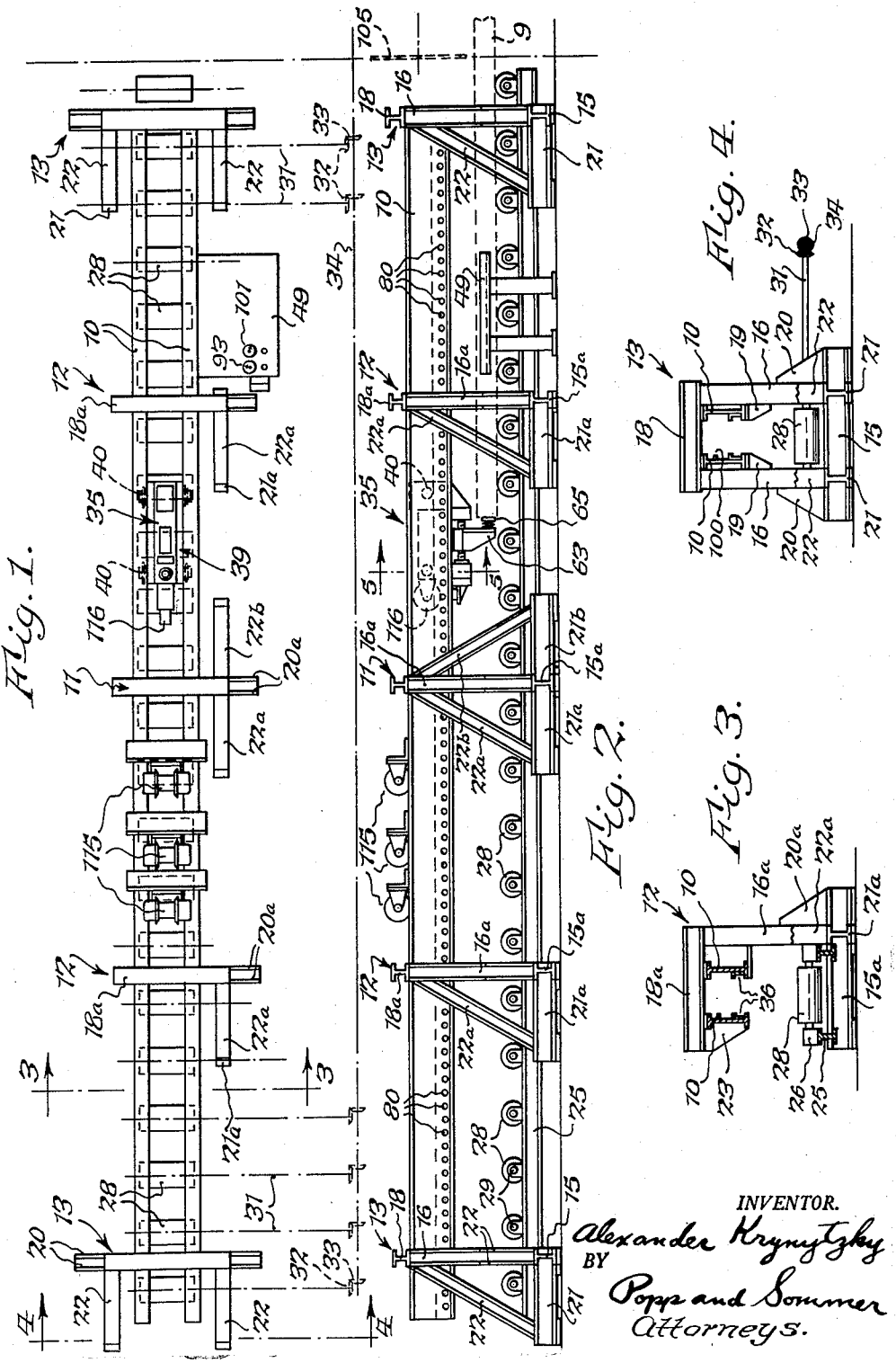
INVENTOR.
Alexander Krynytzky
BY
Popp and Sommer
Attorneys.

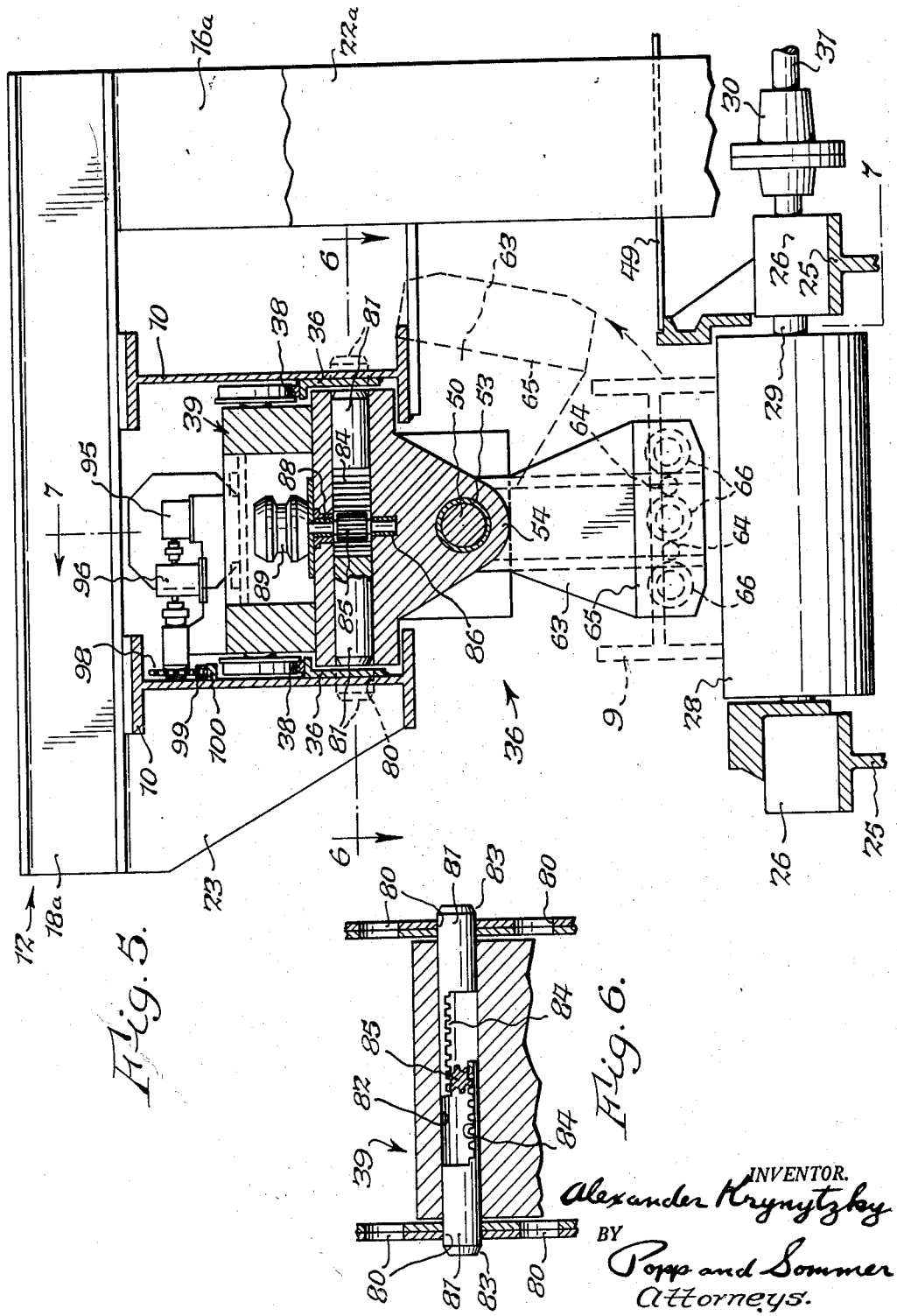

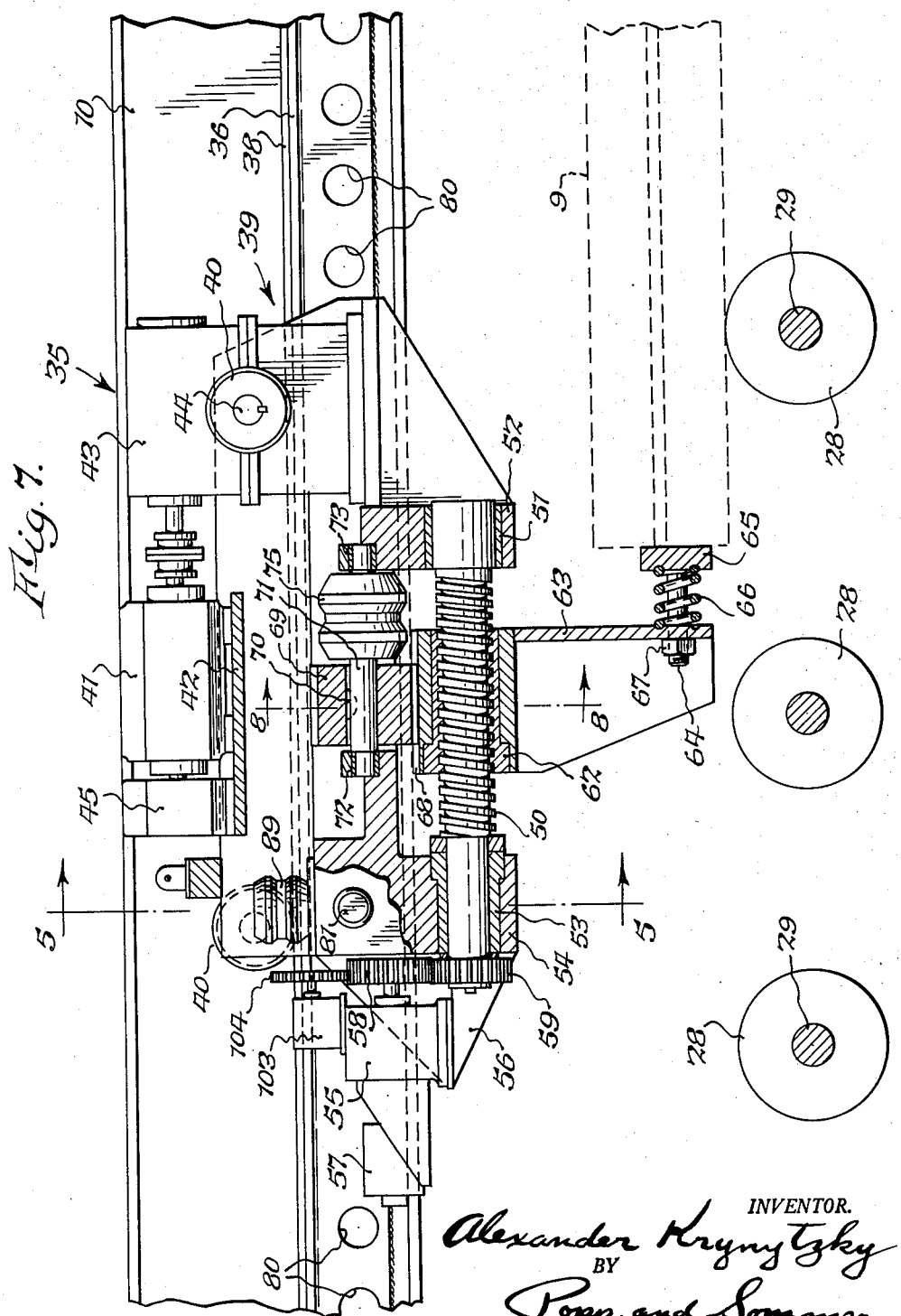

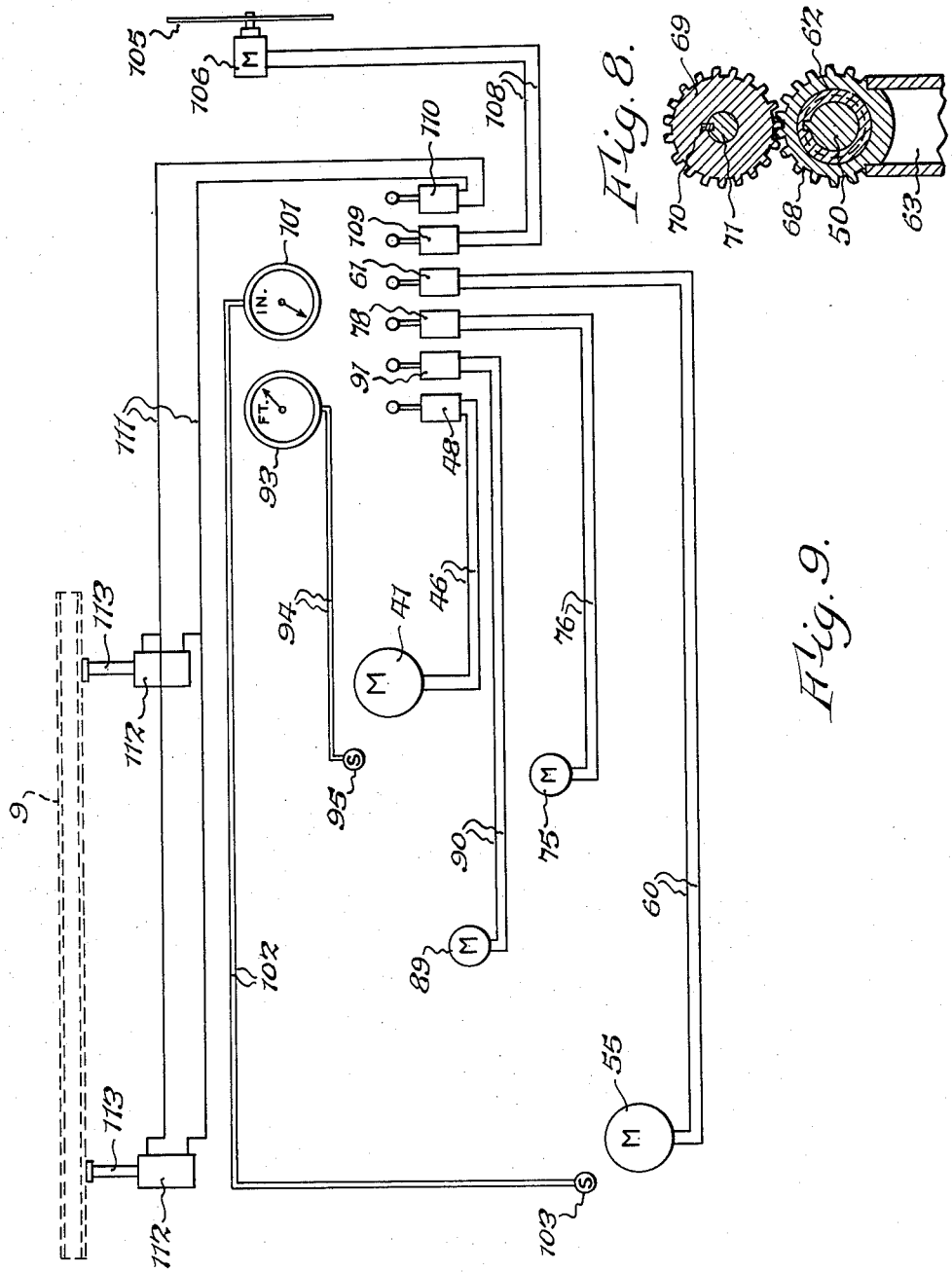

United States Patent Office 2,956,666
Patented Oct. 18, 1960

2,956,666

LENGTH GAGE FOR STRUCTURAL STEEL BEAMS AND THE LIKE

Alexander Krynytzky, Ebenezer, N.Y., assignor to Lake Erie Machinery Corporation, a corporation of New York Filed Mar. 15, 1957, Ser. No. 646,404

9 Claims. (Cl. 198—40)

This invention relates to a gage for determining the lengths of structural steel beams and the like and more particularly to such a length gage combined with a saw for cutting the structural steel to the measured length immediately following the gaging operation.

An object of the invention is to provide such a gage which will measure, with a high degree of accuracy, for sawing or other purposes, long lengths of structural steel, say, pieces up to 80 feet in length or more in increments of, say, 1/64 of an inch.

Another object is to provide such a length gage which is very rugged and in particular will withstand the end thrust of the heavy structural steel parts being fed to the gage.

Another object is to provide such a length gage which can be rapidly set to the exact measurement called for.

Another object is to provide such a gage which has a rough adjustment and a fine adjustment which are preferably separately manipulable.

Another object is to provide such a gage and saw which can be operated from a single control panel or pulpit and in which the setting of the gage is observable from selsyn indicators on the panel.

Another object is to provide a gaging stop which is readily moved into and out of the path of the structural steel length being cut, thereby to permit continued forward movement of the part after cutting.

Another object is to provide such a gage in which the gaged length can be discharged transversely of the machine.

Another object is to provide such a gage and saw which is extremely simple in construction and operation considering the function which it performs.

Another object is to provide an accurate gage indication regardless of any slipping of the carriage wheels on the rails.

Other objects and advantages of the invention will be apparent from the following description and drawings in which:

Fig. 1 is a top plan view of a length gage and saw for structural steel beams and the like, the representation being partly diagrammatic.

Fig. 2 is a side elevational view thereof.

Fig. 3 is a vertical transverse section taken on line 3—3, Fig. 1.

Fig. 4 is an end elevational view, viewed from the left hand end of Fig. 1 as indicated by the line 4—4.

Fig. 5 is a fragmentary enlarged vertical transverse section taken generally on line 5—5, Fig. 2.

Fig. 6 is a fragmentary horizontal sectional view taken generally on line 6—6, Fig. 5.

Fig. 7 is a fragmentary vertical longitudinal section taken generally on line 7—7, Fig. 5.

Fig. 8 is a fragmentary vertical transverse section taken generally on line 8—8, Fig. 7.

Fig. 9 is a simplified diagram of the electrical and air pressure control lines and components which could be used to operate the gage and saw from a control pulpit.

The invention is shown as embodied in a combined length gage and saw for cutting two exact lengths of structural steel beams or the like such as the I-beam 9 shown in dotted lines in Figs. 2, 5 and 7. The machine as illustrated is adapted to measure and saw such structural steel beams or the like up to lengths of 80 feet or more in increments of 1/64 of an inch, the gage length being readily determined from the control pulpit.

The frame of the machine includes a pair of closely spaced horizontal overhead longitudinal I-beams 10 which the full length of the machine and are supported at spaced intervals by a plurality of stands. The machine is of somewhat greater length than the maximum length of the structural steel beam 9 to be measured and cut and the stands supporting the overhead longitudinal beams 10 comprise a central stand 11 flanked by intermediate stands 12 and end stands 13.

Each end stand 13, as best shown in Figs. 1, 2 and 4, comprises a base cross beam 15 supporting a pair of spaced columns 16 which in turn support a top cross beam 18. The columns 16 each support a bracket 19 carrying the overhead longitudinal beams 10. The columns 16 are shown as strengthened by gussets 20 and each stand includes a pair of longitudinal base beams 21 which project lengthwise of the machine from the base cross beam 15 at the base of the column 16. A diagonal beam 22 connects the upper end of each column 16 with the remote extremity of the longitudinal base beam 21 to provide the necessary rigidity.

Each stand 12 is of substantially identical construction to the stand 13 except that the column 16, and its bracing, is omitted from one side of the stand so that after being cut to length the piece 9 of structural steel can be removed sidewise from the machine onto a receiving platform (not shown). Thus, as shown in Figs. 1, 2 and 3, each intermediate stand 12 comprises a base cross beam 15a supporting near one end thereof a single column 16a which in turn supports one end of a top cross beam 18a. The column 16a supports a bracket carrying the adjacent overhead longitudinal beam 10 and the top cross beam 18 projects over the other overhead longitudinal beam 10 and carries a bracket 23 at its outer end which supports this other overhead longitudinal beam 10 as best shown in Fig. 3. The column 16a is shown as strengthened by gussets 20a and each stand 12 includes a longitudinal base beam 21a which projects lengthwise of the machine from the base cross beam 15a at the base of the column. A diagonal beam 22a connects the upper end of the column 16a with the remote extremity of the longitudinal base beam 21a to provide the necessary rigidity.

The stand 11 is identical in construction to the stands 12 except that an additional longitudinal base beam 21b projects lengthwise of the machine from the cross base beam 15a at the base of the column 16a and an additional diagonal beam 22b connects the upper end of each column 16a with the remote extremity of this longitudinal base beam 21b to provide additional rigidity lengthwise of the machine.

It will be seen that by the elimination of the columns 16a at one side of the machine from the stands 11 and 12, the length 9 of structural steel, after being measured and cut, can be quickly removed from the machine by moving it sidewise.

The cross base beams 15 and 15a of the several stands 11, 12 and 13 support a pair of longitudinal base beams 25 which extend from one end of the machine to the other and are arranged below but preferably spaced somewhat further apart than the overhead longitudinal beams 10. At regular intervals these longitudinal base beams 25 carry pairs of bearing stands 26 which in turn support rollers 28, the axes of these rollers extending transversely of the machine and these rollers supporting and moving the length 9 of structural steel into position to be gaged and cut. For this purpose, the shaft 29 of each roller is connected by a suitable coupling 30 with a drive shaft 31. Each drive shaft 31, as best shown in Fig. 1, is connected through bevel gears 32, 33 with a main longitudinal drive shaft 34 that extends the full length of the machine. It will be seen that by turning this main longitudinal drive shaft 34 the several transverse shafts 31 are turned in the same direction and through the couplings 30 rotate the several rollers 28. Accordingly, the length 9 of structural steel fed onto these rolls at the charging or right hand end of the machine as viewed in Figs. 1 and 2 are advanced lengthwise by the rotating rolls 28 toward the gaging mechanism which is indicated generally at 35.

This gaging mechanism 35 moves lengthwise of the machine on rails 36 in the form of angle bars welded to the opposing faces of the overhead I-beams 10 and having narrow flanges projecting toward each other and providing surfaces for wear strips 38 on the rails.

The gaging mechanism 35 comprises a carriage 39 which can be of any suitable construction and is shown as having a front and rear pair of flanged wheels 40 which ride upon the wear strips 38 of the rails 36. The carriage is driven along the rails 36 by means of an electric motor 41 mounted on an upper cross plate 42 of the carriage 39, as best shown in Fig. 7 and, through a gear reducer 43, driving the shaft 44 to which one pair of the wheels 40 for the carriage 39 is fixed. A brake 45 is preferably provided for the shaft of the motor 41 and which is automatically applied when the motor 41 is de-energized. The electric motor 41 and brake 45 is controlled through lines 46 from a manual controller 48 at a control pulpit 49, the manual controller being movable to energize the motor 41 to drive in either direction, thereby to selectively move the carriage 39 in either direction along the rails 36. The manual controller also deenergizes the motor 41 and hence applies the automatic brake 45.

The carriage 39 rotatably supports a screw 50 which is arranged lengthwise of the line of movement of the carriage. This screw is arranged at the bottom of the carriage with its threads exposed and for this purpose one end of the screw 50 is journalled in a bearing 51 in a dependent part 52 of the carriage 39 and the opposite end of the screw is journalled in a bearing 53 in a dependent part 54 of the carriage 39.

This screw 50 is rotated in its bearings 51, 53 by a motor 55 carried by a bracket 56 on the carriage 39 which also carries an automatic brake 57. The motor 55 has a drive gear 58 meshing with a pinion 59 fast to one end of the screw 50. The motor 55 is a reversible motor and its energization, deenergization and direction of drive, and hence the automatic brake, are controlled through lines 60 from a controller 61 on the pulpit 49.

The screw 50 carries a nut 62 to which is fixed a gage or stop arm 63, the free end of which is swingable into the path of the piece 9 of structural steel to be cut to the desired length and forms the gage stop. To prevent injury to the swinging arm 63, a series of cushion stops is provided comprising a row of pins 64 slidably mounted in the free end of the gage arm 63 and each carrying a head or bumper 65 arranged in the path of the lengths 9 of structural steel being gaged and cut. A helical compression spring 66 is interposed between each bumper or head 65 and the swinging gage arm 63 and a nut 67 limits the movement of the cushion under the influence of the spring 66.

The hub of the swinging arm 63 is formed to provide a gear segment 68, the teeth of which are concentric with the axis of the screw 50 and are of sufficient axial length to permit movement of the arm from one end of the screw to the other without losing engagement with a pinion 69 keyed, as at 70, to a shaft 71, journalled in bearings 72 and 73 on the carriage 39. The shaft 71 is turned by a hydromotor 75, preferably air-operated. The lines 76 controlling this hydromotor lead to a controller 78 on the control pulpit 79, this controller permitting the hydromotor 75 to be turned in either direction under manual control of the operator.

In one direction of rotation of the hydromotor 75, the swinging arm 63 is swung to the full line position shown in Figs. 5 and 7. In this position, the several bumpers 65 are in the path of the length 9 of structural steel being gaged and cut. Rotating the hydromotor 75 in the opposite direction swings the arm 63 to the generally horizontal position shown by dotted lines in Fig. 5 and in which position this swinging arm is out of the path of the structural steel member 9 so that it can be advanced longitudinally through the machine in the event this is preferred.

The rails 36 and webs of the overhead I-beams 10 are provided with a series of regularly spaced gage or anchor holes 80 extending in a horizontal line substantially the full length of these beams and rails as best shown in Fig. 2. These holes provide anchorage in securing the coarse adjustment of the position of the carriage 39 and for this purpose any pair of these holes 80 is adapted to be entered by the ends of fins 81 arranged in a transverse cylindrical bore 82 provided in the carriage 39. The outer ends 83 of these pins 81 are tapered or beveled to facilitate their entry into the holes 80 and the inner end of each pin 81 is formed to provide a rack 84, the teeth of these racks opposing each other and engaging a common pinion 85 contained within the bore 82 as best shown in Figs. 5 and 6. The pinion 85 is journalled in bearings 86, 88 in the carriage 39 and the pinion 85 is turned by means of a hydromotor 89, preferably air-operated. As shown in Fig. 9, this hydromotor 89 is driven in either direction by pressure supplied by lines 90 under control of a manual controller 91 on the control pulpit 49. It will be seen that through the manual controller 91, the hydromotor 89 can be rotated in the direction to slide the pins 81 into the anchor or gage holes 80, and that by rotating this hydromotor in the opposite direction, these pins are drawn toward each other to withdraw them from the corresponding pair of anchor holes 80. This provides a coarse gage positioning of the carriage 39, the holes 80 being spaced at, say, one foot intervals so that the coarse gaging of the position of the carriage 39 can be effected in one foot increments by this lock.

This coarse adjustment achieved by inserting the pins 81 into a selected pair of holes 80 in the rails 36 and overhead beams 10 is indicated on the dial of a selsyn transmitter 93 on the control pulpit 49 and which is, of course, calibrated in feet. This selsyn indicator 93 is operated through lines 94 from a selsyn transmitter 95. This selsyn transmitter 95 is mounted on the carriage 39 and is driven through a reduction unit 96 (Fig. 5) from a sprocket 98, the teeth of this sprocket meshing with a roller chain 99 welded or otherwise suitably secured to a horizontal bar 100 projecting from the inner face of one of the overhead I-beams 10 and extending the full length thereof. This selsyn transmitter 95, so positively coupled to the rail by the roller chain 99, insures an accurate distance indication corresponding to the length of the part being gaged, regardless of any slipping of the carriage wheels 40 on the track.

The fine adjustment of the gage is effected from the manual controller 61 (Fig. 9) on the control pulpit 49 of the motor 55 which turns the screw (Fig. 7) so as to move the swinging arm 63 along this screw. This position of fine adjustment of the swinging stop arm 63 is indicated on the dial of a selsyn indicator 101 on the control pulpit 49 and which dial is, of course, calibrated in inches and fractions thereof. This selsyn indicator 101 is connected through lines 102 with a selsyn transmitter 103 mounted on the carriage (Fig. 7). This selsyn transmitter 103 is shown as connected by a pinion 104 with the gear 58 of the fine adjustment motor 55.

After being measured to the required length, the piece 9 of structural steel is sawed to that length. To that end, a rotary saw blade 105 is shown as arranged transversely of the path of the piece 9 of structural steel. This rotary saw blade is arranged at the charging end of the machine, this being at the right hand end as viewed in Fig. 2. This rotary saw blade can be rendered operative by a motor 106 which can both start the saw blade in rotation and also swing the saw blade across the piece 9 of material to be sawed. The motor 106 can be controlled through lines 108 from a controller 109 on the control pulpit 47.

A controller 110 can also be provided for ejecting the cut length 9 of structural steel laterally from the machine. This controller 110, through lines 111, can control the admission of hydraulic fluid to a pair of cylinders 112 containing pistons, the piston rods 113 of which are arranged to move laterally of the machine and to engage the severed length 9 of structural steel. Upon movement of the controller 110 the piston rods 113 are extended to push the severed length 9 of structural steel sidewise laterally from one side of the machine. Such an ejecting mechanism is, of course, more rapid than merely continuing the drive for the rollers 28 so as to discharge the severed piece of structural steel from the end of the machine opposite its charging end.

The various lines leading to the carriage 39 can be wound and unwound from cable and air-line reels 115 suitably mounted on the overhead I-beams 10 as shown in Fig. 1 and a similar reel 116 can also be mounted on the carriage 39 if desired.

*Operation*

In the operation of the machine embodying the present invention, the operator, knowing the length to which the structural steel I-beam 9 is to be cut, operates the controller 48 (Fig. 9) which, through the lines 46 operates the motor 41 to drive the carriage 39 in the required direction along the tracks 36. Thus, energizing this motor 41 (Fig. 7), through the reducer 43, drives the axle or cross shaft 44 thereby turning the drive wheels 40 so as to move the carriage 39 in that direction required for the desired length of the structural steel part 9 to be cut. As the carriage 39 is so moved along its tracks 36 by the motor 41, the selsyn transmitter 95 (Fig. 5) is turned, through the sprocket 98 and roller chain 100, to correspond to the travel of the carriage 39 both as to direction and extent of such travel. Through the line 94 (Fig. 9) and selsyn indicator 93, this movement is registered on that dial at the pulpit 49 which indicates the position of the carriage 39 in feet. By watching the dial of the selsyn transmitter 93, the operator can bring the carriage to the measurement in feet of the desired length of the structural steel part 9. The chain drive 99 for the selsyn transmitter 95 (Fig. 5) insures an accurate distance reading on the selsyn indicator 93 even though slippage may have taken place between the wheels 40 and the track. When this position is reached, the operator releases the controller 48 so as to deenergize the motor 41 and set the automatic brake 45 thereby to stop the movement of the carriage 39. It is essential that the operator stop the carriage at intervals of one foot since when it is stopped the pins 81 must aline with a corresponding pair of holes 80 through the tracks 86 and longitudinal overhead beams 10.

The operator at the pulpit 49 then moves his controller 91 (Fig. 9) so as to introduce fluid through the lines 90 to the hydromotor 89 in the direction to cause this hydromotor to move the locking pins 81 away from each other and into the holes 80. Thus, Fig. 5, the hydromotor turns the pinions 85 so as to spread the racks 84 and pins 81 apart. The beveled ends 83 of these pins, Fig. 6, enter the corresponding pair of holes 80 thereby to lock the carriage 39 accurately at the distance, measured in one foot units, nearest, but short of, the required ultimate length of the piece 9 being gaged and cut.

To secure fine adjustment of the gage arm 63, the operator at the pulpit 49 moves the controller 61 (Fig. 9) so as to actuate the motor 55 to drive the gear 58 in the desired direction. Through the pinion 59, this rotates the screw 50 in a corresponding direction to move the swinging arm 63 lengthwise of the screw. Corresponding movements of the selsyn transmitter 103, from the take-off pinion meshing with the gear 58, is transmitted through the lines 102 to the selsyn indicator 101 at the pulpit 49 and which has a dial calibrated in inches and fractions thereof. When the hand on this dial reaches the setting in inches and fractions thereof which, when added to the reading of the dial of the selsyn transmitter 93, equals the desired length of the structural steel part 9, the operator actuates the controller 61 so as to deenergize the motor 55 and apply the automatic brake 57 thereby to discontinue rotation of the screw 50 and hence movement of the swinging arm 63 along this screw.

The operator then actuates the controller 78 (Fig. 9) which, through the lines 76, actuates the hydromotor 75. This hydromotor (Fig. 7) turns its pinion 69 so as to rotate the gear segment 68 formed on the hub of the swinging arm 63. The hydromotor 75 is actuated in the direction to swing the swinging arm from the generally horizontal dotted line position shown in Fig. 5 to the vertical operative position shown by full lines in this figure. In this operative position of the swinging arm 63 the bumpers 65 are arranged in line with the structural steel part 9 to be cut to the desired length. Also, through the actuation of the motors 41 and 55 as previously described, these bumpers have been set at the exact distance, measured in feet, inches and fractions of inches, equal to the desired length of the structural steel part 9. Because of the screw threads 50, as the stop arm 63 moves out of the working position it also moves away from the work and therefore eliminates any scratching or even dragging of the work on the roller table. The drive shaft 34 is then placed in operation by any suitable means (not shown) so as to rotate, through the bevel gears 32, 33 and transverse shafts 31, the several rollers 28 in that direction to move the structural steel part 9 from the charging end of the machine toward the bumpers 65. The leading end of the structural steel part 9 to be cut is placed upon these rollers and their rotation brings the steel part into engagement with the bumpers 65 and which stop further forward movement of the steel part.

The movement of the rollers 28 is stopped and the operator actuates the controller 109 at the control pulpit 49 so as to energize the motor 106 (Fig. 9) which operates the saw blade 105, preferably both to rotate this saw blade and also to swing this saw blade across the part 9 to be cut to length. Accordingly, the part 9 is cut to the exact length indicated in feet, inches and fractions of inches on the dials of the selsyn indicators 93 and 101.

The operator then actuates the controller 109 so as to bring the saw blade back to its original inoperative position out of line with the part 9 which has been sawed. The operator then actuates the controller 78 (Fig. 9) so as to operate the hydromotor 75 in that direction (Fig. 7) to rotate the pinion 69 and through the gear segment teeth 68 on the hub of the swinging arm 63 to raise the swinging arm from the full to the dotted line position shown in Fig. 5 and in which latter position it is out of the path of the part 9 being measured and cut. It will be noted that in this movement the swinging arm 63 is swung approximately a quarter turn on the screw 50 and the pitch of the screw is such that in so moving to its inoperative dotted line position shown in Fig. 5, the swinging arm 63 backs away from the end of the part 9 which has been cut to measure. By this means the bumpers 65 are not dragged along the advance end of the part 9 which has been cut to the desired length but these bumpers are withdrawn from contact with this end of the part being measured as the arm 63 is being swung to its inoperative position.

The operator then moves his controller 110 so as to admit fluid to the pistons 112 in the direction to project the piston rods 113 and shove the cut structural steel part 9 laterally from the machine. It will be noted that this is possible since the stands 11 and 12 have a post 16, 16a only at one side of the machine so that the structural steel part 9 can readily be shoved onto the table or receiving platform 17 on the side of the machine opposite these posts 16, 16a.

After the cut part 9 has been ejected from the machine, the operator actuates the controller 110 to retract the piston rods 113. The parts are then in the position assumed at the start of the description of the operation of the machine and in condition for a repetition of the cycle as above described.

From the foregoing, it will be seen that the present invention provides a simple and effective device for cutting heavy structural steel parts to exact lengths with a high degree of accuracy and with a minimum of manual effort and also with a minimum of handling of the part to be measured. It will further be seen that the apparatus, while highly accurate in its function, is rugged in construction and will stand up under conditions of severe and constant use without getting out of order.

I claim:

1. A length gage for structural steel beams and the like, comprising a substantially straight track, a carriage on said track, automotive means for moving said carriage along said track, means at a control station for actuating said automotive means to move said carriage in either direction and to stop said automotive means, an indicator showing the distance of said carriage from a predetermined point along said track, means for moving the structural steel beam lengthwise parallel with said track, a screw rotatably journalled in said carriage to rotate about an axis extending lengthwise of the path of travel of said carriage, a nut screwed on said screw and moved axially on rotation of said screw, a stop mounted on said nut in the path of said structural steel beam, a reversible motor on said carriage operatively connected with said screw, means at said control station for controlling said motor and an indicator at said control station showing the position of said stop along said screw.

2. A length gage as set forth in claim 1 wherein said last indicator at said control station is a selsyn indicator and is coupled with a selsyn indicator driven by said motor and mounted on said carriage.

3. A length gage as set forth in claim 1 wherein means are arranged to swing said stop into and out of the path of the structural steel beam being measured.

4. A length gage as set forth in claim 1 wherein said stop is in the form of an arm projecting radially from said nut, and wherein said length gage additionally includes concentric gear teeth projecting from said nut, a pinion meshing with said gear teeth, a reversible motor driving said pinion, and means at said control station controlling said motor to swing said stop arm into and out of the path of the structural steel beam being measured.

5. A length gage for structural steel beams and the like, comprising a substantially straight track, a carriage on said track, electric motor means mounted on said carriage for moving said carriage along said track, means at a stationary control station for actuating said electric motor means to move said carriage in either direction and to stop said electric motor means, an anchoring member on said carriage projectable into and out of engagement with a plurality of stationary stop shoulders spaced along said track, a motor on said carriage operative to project and retract said anchoring member, a manual controller at said stationary control station and operative to render said last mentioned motor operative and inoperative, an indicator at said stationary control station showing the distance of said carriage from a predetermined point along said track, conveyor means along said track for moving the structural steel conveyor means along said track for moving the structural steel beam lengthwise parallel with said track, power means for actuating said conveyor means, means at said stationary control station for energizing and deenergizing said power means, and a stop on said carriage in the path of said structural steel beam.

6. A length gage as set forth in claim 5 wherein said stop shoulders are in the form of a series of holes parallel with said track, and wherein said anchoring member is projectable into any one of said holes.

7. A length gage for structural steel beams and the like, comprising a substantially straight track, a carriage on said track, electric motor means mounted on said carriage for moving said carriage along said track, means at a stationary control station for actuating said electric motor means to move said carriage in either direction and to stop said electric motor means, an indicator at said stationary control station showing the distance of said carriage from a predetermined point along said track, conveyor means along said track for moving the structural steel beam lengthwise parallel with said track, power means for actuating said conveyor means, means at said stationary control station for energizing and deenergizing said power means, a stop in the path of said structural steel beam, means movably supporting said stop on said carriage for movement lengthwise of the line of travel of said carriage, a motor on said carriage operatively connected to said stop to move it fore-and-aft of said carriage, means controlling said motor and an indicator showing the position of said stop along said carriage.

8. A length gage as set forth in claim 7 wherein both of said indicators are at said stationary control station, said first indicator being calibrated in relatively large units of linear measurement and said second indicator being calibrated in relatively small units of linear measurement.

9. A length gage as set forth in claim 8 wherein said means for rendering said motor operative and inoperative to move said stop in either direction are arranged at said control station.

References Cited in the file of this patent
UNITED STATES PATENTS

| | | |
|---|---|---|
| 954,396 | Klindworth | Apr. 5, 1910 |
| 1,863,005 | Campbell | June 14, 1932 |
| 1,895,440 | Barney | Jan. 31, 1933 |
| 1,900,933 | Hudson | Mar. 14, 1933 |
| 2,353,437 | Bock | June 11, 1944 |
| 2,397,192 | Meyerbach | Mar. 26, 1946 |
| 2,485,274 | Garrett | Oct. 18, 1949 |
| 2,634,405 | Van Stone et al. | Apr. 7, 1953 |
| 2,711,006 | Abbey | June 21, 1955 |